United States Patent
Klein et al.

(10) Patent No.: US 12,466,233 B2
(45) Date of Patent: Nov. 11, 2025

(54) AIR DUCT SYSTEM

(71) Applicant: Mahle International GmbH, Stuttgart (DE)

(72) Inventors: Florian Klein, Bad Liebenzell-Moettlingen (DE); Markus Michael, Ilsfeld (DE); Anja Reiter, Schorndorf (DE); Jochen Schaudt, Hechingen (DE); Oliver Schultze, Stuttgart (DE)

(73) Assignee: Mahle International GmbH (DE)

( * ) Notice: Subject to any disclaimer, the term of this patent is extended or adjusted under 35 U.S.C. 154(b) by 592 days.

(21) Appl. No.: 17/669,342

(22) Filed: Feb. 10, 2022

(65) Prior Publication Data

US 2022/0250437 A1 Aug. 11, 2022

(30) Foreign Application Priority Data

Feb. 11, 2021 (DE) ...................... 10 2021 201 297.3

(51) Int. Cl.
*B60H 1/00* (2006.01)
*B60H 1/22* (2006.01)

(52) U.S. Cl.
CPC . *B60H 1/00564* (2013.01); *B60H 2001/2246* (2013.01)

(58) Field of Classification Search
CPC ................ B60H 1/00564; B60H 1/00792
See application file for complete search history.

(56) References Cited

U.S. PATENT DOCUMENTS

| 4,702,753 A | 10/1987 | Kowalczyk |
| 5,862,674 A | 1/1999 | Ichishi et al. |
| 9,739,651 B1 * | 8/2017 | Al-Otaibi .................. G01F 1/36 |
| 2007/0220987 A1 | 9/2007 | Clifton et al. |
| 2008/0072979 A1 | 3/2008 | Rosenbaum |
| 2013/0055799 A1 | 3/2013 | Tsujii |
| 2017/0158020 A1 * | 6/2017 | Park ...................... G01N 15/06 |

FOREIGN PATENT DOCUMENTS

| CN | 208456932 U | 2/2019 |
| DE | 4123063 A1 | 1/1993 |

OTHER PUBLICATIONS

German Search Report for DE-10 2021 201 297.3, dated Aug. 31, 2021.
Chinese Office Action and Search Report, CN202210121607.X, dated Mar. 22, 2025 (w_translation).

* cited by examiner

*Primary Examiner* — Allen R. B. Schult
(74) *Attorney, Agent, or Firm* — Fishman Stewart PLLC

(57) ABSTRACT

An air duct system for conducting air within an HVAC equipment of a motor vehicle may include a housing of the HVAC equipment, a sensor through which air is flowable, and at least one air duct connected to the sensor in an air-conducting manner. The housing may include (i) a first housing part with a first connecting surface and (ii) a second housing part with a second connecting surface. The first housing part and the second housing part may abut one another and may be fixedly connected to each other via the first and second connecting surface. The at least one air duct may be formed, at least in regions, between the first and second connecting surface. The at least one air duct may have at least one constriction point at which a cross-section of the at least one air duct is reduced.

20 Claims, 4 Drawing Sheets

AIR DUCT SYSTEM

CROSS-REFERENCE TO RELATED APPLICATIONS

This application claims priority to German Patent Application No. DE 10 2021 201 297.3, filed on Feb. 11, 2021, the contents of which is hereby incorporated by reference in its entirety.

TECHNICAL FIELD

The invention relates to an air duct system for conducting air within an HVAC equipment of a motor vehicle.

BACKGROUND

HVAC equipments (HVAC: Heating, Ventilation and Air Conditioning) for motor vehicles are already known from the prior art and are used for conditioning air. To also take the quality of air into account during conditioning, an air duct system with a sensor device—for example with a fine dust sensor—is often used. In addition to the sensor device, the air duct system also comprises air ducts leading to and from the sensor device. The air ducts can be formed at least in some areas in a housing of the HVAC equipment.

To increase the measuring accuracy of the sensor device, a stable air flow is necessary. Disadvantageously, the air flow can be weakened by long flow paths. Where the air ducts are formed in the housing, burr formation can also disturb the air flow. As a solution, for example, a fan may be provided in the air duct, but this unnecessarily increases the cost of the air duct system.

SUMMARY

The object of the invention is therefore to provide an improved or at least alternative embodiment for an air duct system of the generic type, in which the disadvantages described are overcome.

According to the invention, this object is solved by the subject matter of the independent claim(s). Advantageous embodiments are the subject matter of the dependent claim(s).

An air duct system is provided for conducting air within an HVAC equipment of a motor vehicle. The air duct system comprises a housing of the HVAC equipment and a sensor device through which air can pass. The housing has at least two housing parts, each with a connecting surface. The one housing part and the other housing part abut each other and are firmly connected to each other by the respective connecting surfaces. At least one air duct through which air can pass is formed at least in some areas between the two abutting connecting surfaces. The at least one air duct is connected to the sensor device in an air-conducting manner. According to the invention, the at least one air duct has at least one constriction point at which the cross section of the at least one air duct through which air can pass is reduced. In the air duct system according to the invention, the necessary and stable air flow to the sensor device is made possible, thereby increasing the measuring accuracy of the sensor device.

The HVAC equipment (Heating, Ventilation and Air Conditioning) is primarily an air conditioning system or a component of the air conditioning system of the motor vehicle. The sensor device may, for example, comprise or be formed by a fine dust sensor and/or a so-called air quality sensor. In the housing, the at least one air duct may be formed by a groove in at least one of the connecting surfaces. The at least one air duct may be fully formed in the housing of the HVAC equipment. Alternatively, the at least one air duct may be formed regionally in the housing of the HVAC equipment and regionally by flexible hoses. It is also conceivable that the at least one air duct is formed by further elements—for example connecting pieces or coupling pieces.

Advantageously, the air duct system can have two air ducts, one air duct being provided for the inflow of air to the sensor device and the other air duct being provided for the outflow of air from the sensor device. The constriction point may be formed in the air duct for the inflow of air and/or in the air duct for the outflow of air. Preferably, the constriction point is formed only in the air duct for the outflow of air—and thus no constriction point is formed in the air duct for the inflow of air. In this way, dust accumulation in the air duct for the inflow of air and an accompanying decrease in the measuring accuracy of the sensor device can be avoided.

Advantageously, the cross-section of the at least one air duct through which air can pass may be reduced at the constriction point in an hourglass shape in the longitudinal direction of the at least one air duct or may be reduced in a comb-like or diaphragm-like manner. The design of the cross-section through which air can pass can be adapted to the design or the route of the at least one air duct and the sensor device in order to achieve the necessary and safe air flow to and from the sensor device.

In an advantageous embodiment of the air duct system, the constriction point of the at least one air duct within the housing is formed by a formation. The formation is integrally formed on the housing—or integrally formed with the housing—and is directed transversely to the longitudinal direction of the at least one air duct into the at least one air duct. Advantageously, the formation can be adapted to the design or the route of the at least one air duct and the sensor device. To appropriately avoid possible burr formation at the formation, no further air duct separation is present within the formation. This can increase the robustness and service life of the constriction point.

In addition, the formation can be formed on one of the housing parts and can be directed from the top down into the at least one air duct of the HVAC equipment properly installed in the motor vehicle. This can prevent dust from accumulating at the constriction point. The formation may reduce the cross-section through which air can pass in a deviating manner—for example, in an hourglass-shaped or comb-like or diaphragm-like manner. The terms "top" and "down" refer to the earth's gravitational force, which, in the HVAC equipment properly installed in the motor vehicle, is directed downwardly.

In a further advantageous embodiment of the air duct system, the constriction point is formed by a separate insert piece. The insert piece is arranged in the at least one air duct and blocks, transversely to the longitudinal direction of the at least one air duct, a region of the cross-section of the at least one air duct through which air can pass. The insert piece in this case may be more flexible in design and development than a formation described above. Furthermore, the insert piece and the housing or the at least one air duct may be formed from different materials. For example, the insert piece may be formed from a harder material than the at least one air duct.

In addition, an outer diameter of the insert piece may correspond to an inner diameter of the at least one air duct and the cross-section of the at least one air duct through which air can pass may be determined at the constriction point by a central opening of the insert piece aligned in the longitudinal direction of the at least one air duct.

In a further advantageous embodiment of the air duct system, the at least one air duct is formed outside the housing, at least in regions, by a separate coupling piece in which the constriction point of the at least one air duct is formed. It is conceivable that the coupling piece is arranged between the housing and a flexible hose or alternatively between two hose sections of a flexible hose. The at least one air duct is then formed regionally in the housing, regionally by the flexible hose and regionally by the coupling piece. However, it is also conceivable that the coupling piece is arranged between the housing and the sensor device. The at least one air duct is then formed in part in the housing and in part by the coupling piece.

In a further advantageous embodiment of the air duct system, the constriction point may be formed by a screw element which is screwed into the at least one air duct from the outside transversely to the longitudinal direction of the at least one air duct. The screw element can be, for example, an ordinary screw or a specially manufactured extra part with a thread. The screw element covers a region of the cross-section in the at least one air duct and, depending on the design, can reduce the cross-section of the at least one air duct through which air can pass to different degrees.

In addition, the cross-section of the at least one air duct through which air can pass may be adjusted at the constriction point by adjusting the screw-in depth of the screw element. In this way, for example, manufacturing tolerances in the at least one air duct can be compensated. The necessary screw-in depth can be determined, for example, by measurement—for example of the pressure loss in the at least one air duct. Advantageously, the measurement of the screw-in depth and the pressure loss can be performed online with a feedback loop.

As a high-end variant, the adjustment of the screw-in depth of the screw element by means of a stepper motor can advantageously also be performed during operation of the HVAC equipment. In this case, a constriction caused by clogging, for example, or a widening of the at least one air duct caused by material deformation, for example, can be compensated for during operation. In this way, the necessary and stable air flow to the sensor device can be ensured over the service life of the HVAC equipment.

Further important features and advantages of the invention will be apparent from the subclaims, drawings and the accompanying figure description based on the drawings.

It goes without saying that the above features, and those to be explained below, can be used not only in the combination indicated in each case, but also in other combinations or on their own, without departing from the scope of the present invention.

Preferred embodiments of the invention are shown in the drawings and will be explained in more detail in the following description, wherein identical reference numerals refer to identical or similar or functionally identical components.

DETAILED DESCRIPTION

Figure 1:
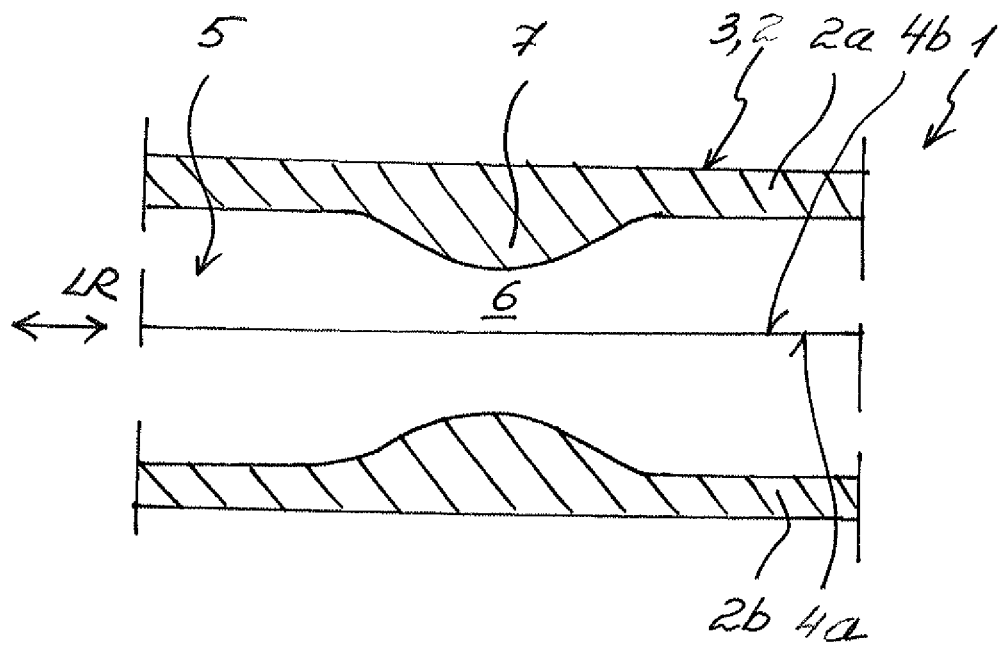
FIG. 1 shows a sectional view of an air duct system according to the invention in a first embodiment.

FIG. 1 shows a sectional view of an air duct system 1 according to the invention in a first embodiment. The air duct system 1 has a housing 2 of the HVAC equipment 3 and a sensor device (not shown here). The HVAC equipment 3 may be an air conditioning system or a component of the air conditioning system of the motor vehicle. The housing 2 has two housing parts 2a and 2b, each having a connecting surface 4a and 4b, the housing parts 2a and 2b abutting one another and being fixedly connected to each other by the respective connecting surfaces 4a and 4b. An air duct 5 is formed between the connecting surfaces 4a and 4b, which is aligned in the longitudinal direction LR and can lead to or from the sensor device. The air in the air duct 5 flows in the longitudinal direction LR.

The air duct 5 has a constriction point 6 at which the cross-section of the air duct 5 through which air can pass is reduced. This enables the necessary and stable air flow to the sensor device in the air duct system 1. In the first embodiment shown here, the constriction point 6 of the air duct 5 is formed by a formation 7. Here, the formation 7 is integrally formed on the housing 2 or integrally formed with the housing 2 and is directed into the air duct 5 transversely to the longitudinal direction LR. It is appropriate that no further air duct separation is present within the formation 7, so that burr formation is avoided at the formation. Due to the formation 7, the constriction point 6 is hourglass-shaped.

Figure 2:
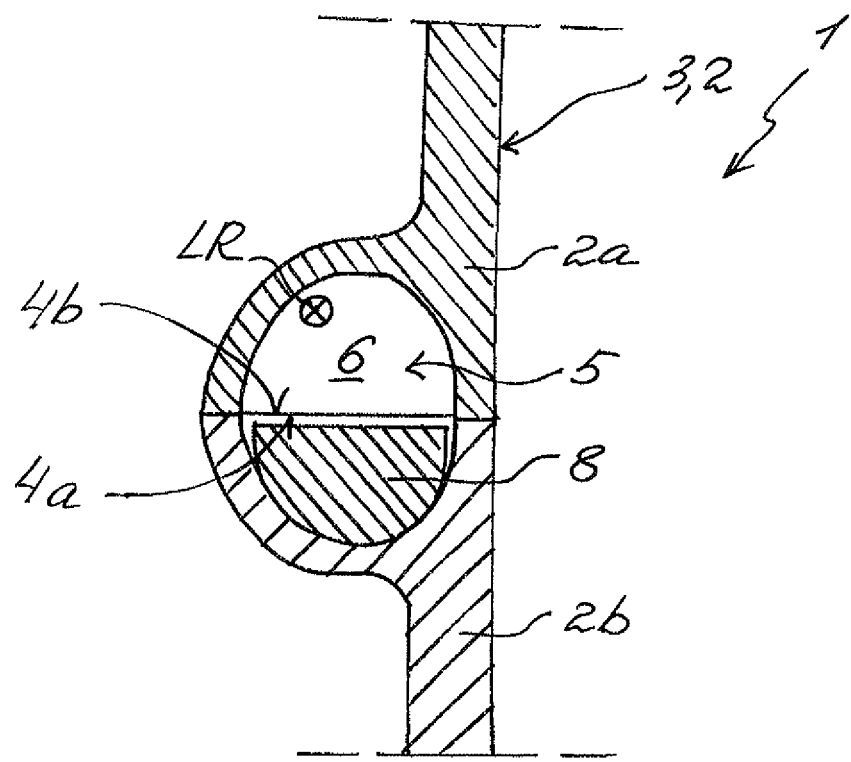
FIGS. 2 through 5 show sectional views of the air duct system according to the invention in a second embodiment with differently designed constriction points in differently designed air ducts.

FIG. 2 shows a sectional view of the air duct system 1 according to the invention in a second embodiment. In the second embodiment, the constriction point 6 is formed by a separate insert piece 8. In FIG. 2, the insert piece 8 is arranged in the lower housing part 2b and blocks the cross-section of the air duct 5 transverse to the longitudinal direction LR. It goes without saying that the insert piece 8 can also be formed differently than shown.

Figure 3:
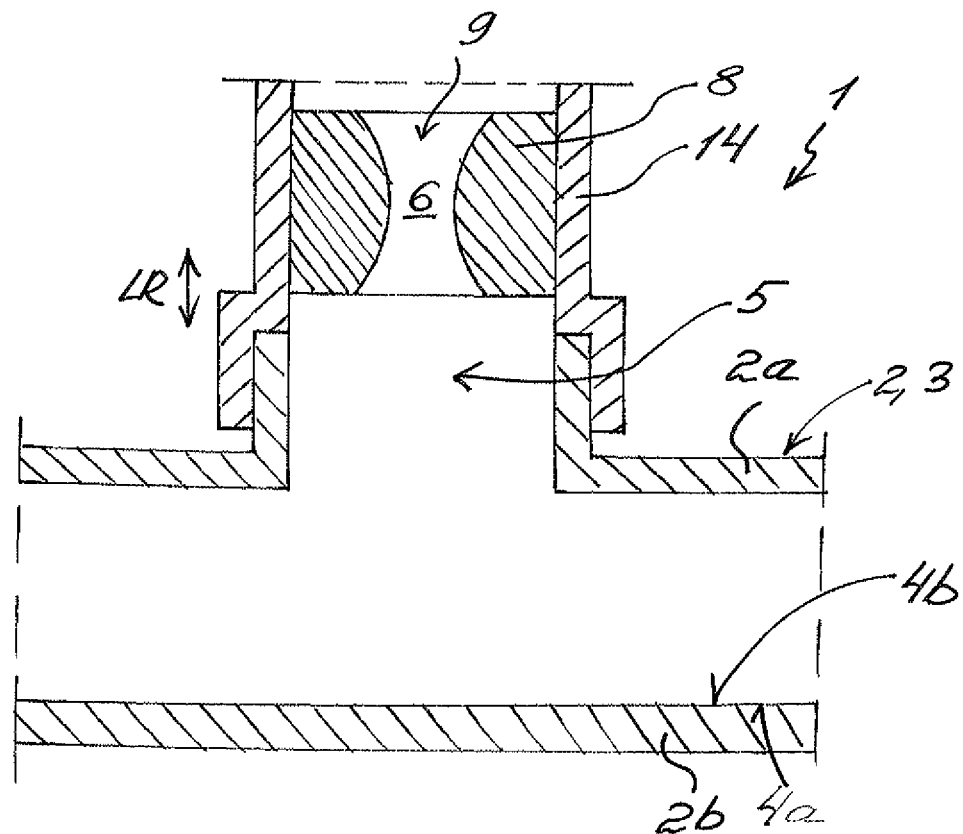

FIG. 3 shows a sectional view of the air duct system 1 according to the invention in the second embodiment. Here, the constriction point 6 is formed by the separate insert piece 8, which, however, is formed differently from the insert piece 8 in FIG. 2. The air duct 5 is formed differently from the air duct 5 in FIG. 2 in regions by a separate connecting piece 14 in which the insert piece 8 is arranged. The outer diameter of the insert piece 8 shown here corresponds to the inner diameter of the air duct 5 or of the connecting piece 14. The cross-section of the air duct 5 or of the connecting piece 14 through which air can pass at the constriction point 6 is formed by an hourglass-shaped central opening 9 of the insert piece 8. It goes without saying that the opening 10 can also be formed differently than shown.

Figure 4:
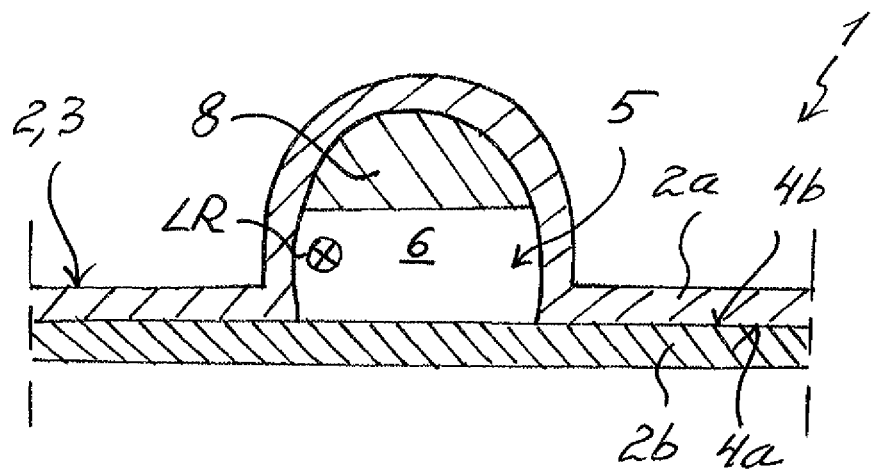

FIG. 4 shows a sectional view of the air duct system 1 according to the invention in the second embodiment. Here, the constriction point 6 is formed by the separate insert piece 8, which is, however, formed differently from the insert piece 8 in FIGS. 2-3. The air duct 5 also differs from the air duct in FIGS. 2-3. Here, the insert piece 8 is arranged in the housing part 2a and is located at the top of the HVAC equipment 3 properly installed in the motor vehicle. This can advantageously prevent dust from accumulating at the constriction point 6.

Figure 5:
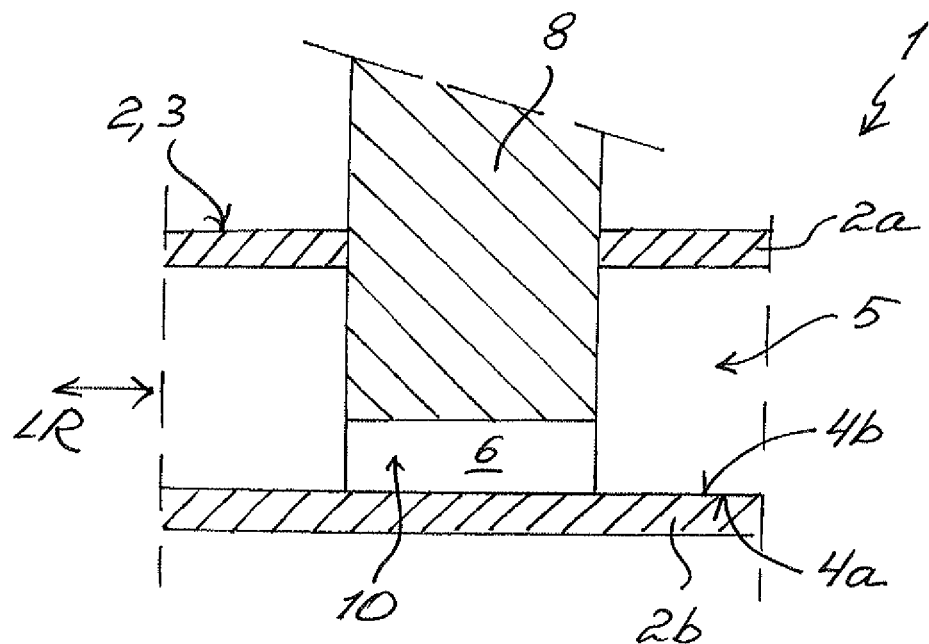

FIG. 5 shows a sectional view of the air duct system 1 according to the invention in the second embodiment. Here, the constriction point 6 is formed by the separate insert piece 8, which is, however, formed differently from the insert piece 8 in FIGS. 2-4. The air duct 5 also differs from the air duct in FIGS. 2-4. The insert piece 8 engages here from the outside transversely to the longitudinal direction LR in the air duct 5 and blocks the air duct 5. The air may flow exclusively through a central recess 10 in the insert piece 8. Accordingly, the cross-section of the air duct 5 through which air can pass within the constriction point 6 is determined by the shape of the recess 10.

Referring to FIG. 2-5, the insert part 8 is easier to handle during installation. In addition, the insert piece 8 can be formed from a different material than the housing 2 and correspondingly the air duct 5.

Figure 6:
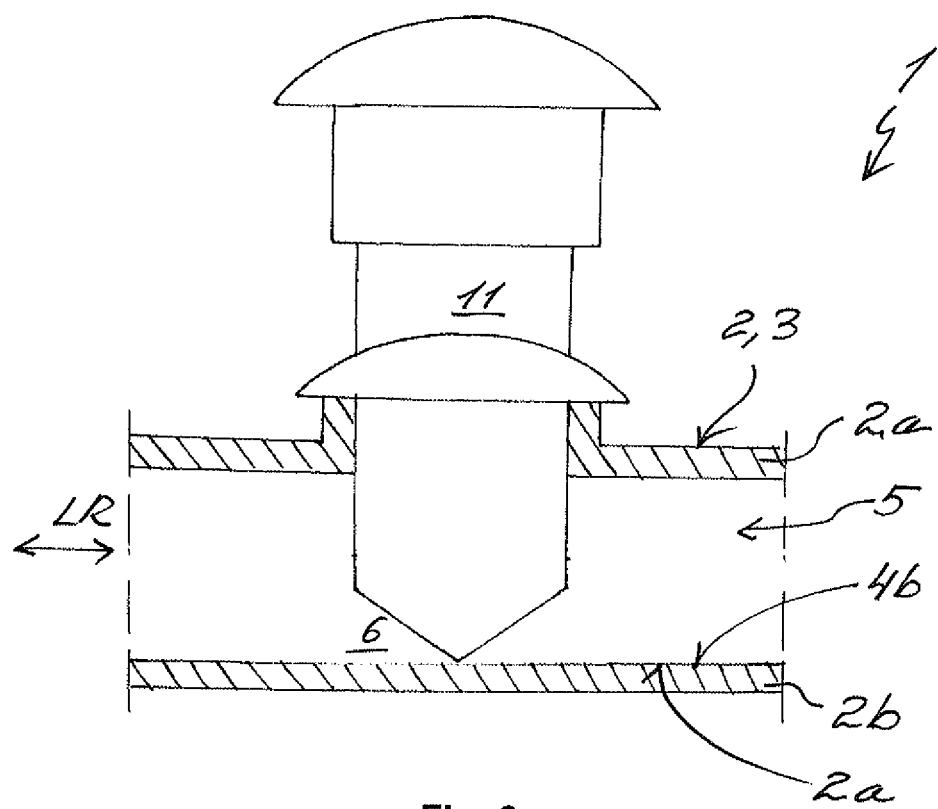
FIG. 6 shows a sectional view of the air duct system according to the invention in a third embodiment.

FIG. 6 shows a sectional view of the air duct system according to the invention in a third embodiment. In the third embodiment, the constriction point 6 is formed by a screw element 11 which engages from the outside transversely to the longitudinal direction LR of the air duct 5 and which is screwed to the housing 2. By adjusting the screw-in depth of the screw element 11, the cross-section of the air duct 5 through which air can pass can also be adjusted. In this way, manufacturing tolerances in the air duct 5 can be compensated for and changes in the air duct 5 over time can be leveled. It is also conceivable that the screw-in depth of the screw element 11 is adjusted by means of a stepper motor.

Figure 7:
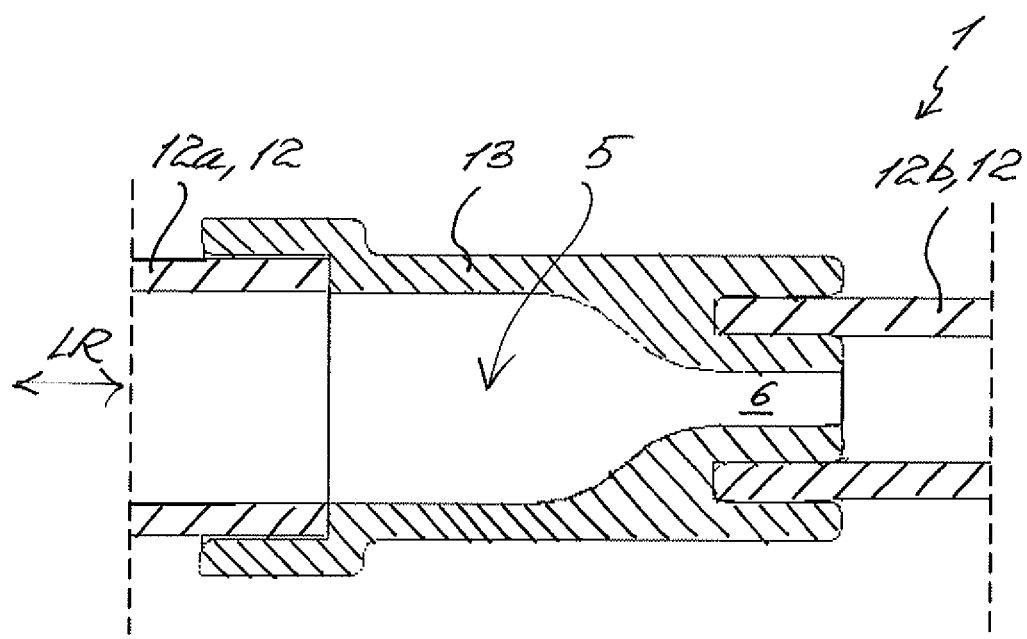
FIG. 7 shows a sectional view of the air duct system according to the invention in a fourth embodiment.

FIG. 7 shows a sectional view of the air duct system 1 according to the invention in a fourth embodiment. Here, the air duct 5 outside the housing 2 is formed partially by two hose sections 12a and 12b of a flexible hose 12 and a separate coupling piece 13. The constriction point 6 is formed in the coupling piece 13.

The invention claimed is:

1. An air duct system for conducting air within an HVAC equipment of a motor vehicle, comprising:
a housing of the HVAC equipment;
a sensor through which air is flowable;
the housing including at least two housing parts each with a connecting surface, the at least two housing parts including (i) a first housing part with a first connecting surface and (ii) a second housing part with a second connecting surface;
the first housing part and the second housing part fixedly connected to each with the first connecting surface and the second connecting surface abutting one another;
the first connecting surface and the second connecting surface forming at least one air passage therebetween;
the at least one air passage connected to the sensor in an air-conducting manner; and
wherein the at least one air passage has at least one constriction point at which a cross-section of the at least one air passage is reduced.

2. The air duct system of claim 1, wherein the cross-section of the at least one air passage is reduced at the at least one constriction point in an hourglass-shaped manner in a longitudinal direction of the at least one air passage.

3. The air duct system of claim 1, wherein:
the at least one constriction point of the at least one air passage is formed within the housing via a formation; and
the formation is integrally arranged on the housing and protrudes into the at least one air passage transversely with respect to a longitudinal direction of the at least one air passage.

4. The air duct system of claim 3, wherein the formation is formed on one of the at least two housing parts and protrudes into the at least one air passage in a top down manner when the HVAC equipment is properly installed in the motor vehicle.

5. The air duct system of claim 1, wherein:
the at least one constriction point is formed via an insert piece that is structured as a separate, individual component from the housing; and
the insert piece is arranged in the at least one air passage and blocks, transversely with respect to a longitudinal direction of the at least one air passage, a region of the cross-section of the at least one air passage.

6. The air duct system of claim 5, wherein:
an outer diameter of the insert piece corresponds to an inner diameter of the at least one air passage; and
the cross-section of the at least one air passage is determined at the at least one constriction point via a central opening of the insert piece that is aligned in the longitudinal direction.

7. The air duct system of claim 1, wherein the at least one air passage is formed outside the housing, at least in regions, via a separate coupling piece in which the at least one constriction point is formed.

8. The air duct system of claim 1, wherein:
the at least one constriction point is formed via a screw element; and
the screw element is screwed into the at least one air passage from an outside transversely with respect to a longitudinal direction of the at least one air passage.

9. The air duct system of claim 8, wherein the cross-section of the at least one air passage is adjustable at the at least one constriction point via adjusting a screw-in depth of the screw element.

10. The air duct system of claim 1, wherein:
the at least one air passage includes two air passages, the two air passages including an inflow air passage for conducting an inflow of air to the sensor and an outflow air passage for conducting an out-flow of air from the sensor; and
the at least one constriction point is formed in at least one of the inflow air passage and the outflow air passage.

11. The air duct system of claim 1, wherein:
the at least one air passage includes two air passages;
the two air passages includes an inflow air passage for conducting an inflow of air to the sensor and an outflow air passage for conducting an out-flow of air from the sensor; and
the at least one constriction point is formed exclusively in the outflow air passage.

12. The air duct system of claim 9, further comprising a stepper motor via which the screw-in depth of the screw element is adjustable.

13. An air duct system for conducting air within a component of an air conditioning system of a motor vehicle, comprising:
- component housing including (i) a first housing part with a first connecting surface and (ii) a second housing part with a second connecting surface complimentary to the first connecting surface;
- the first connecting surface and the second connecting surface lying on one another and forming at least one air passage therebetween;
- a sensor through which air is flowable, the sensor connected to the at least one air passage in an air-conducting manner;
- the first housing part and the second housing part connected to each other with the first connecting surface and the second connecting surface abutting one another;
- wherein at least a portion of the at least one air passage is defined by and between the first connecting surface and second connecting surface; and
- wherein, at at least one constriction point, the at least one air passage has a reduced cross-section that is smaller than a cross-section of the at least one air passage outside of the at least one constriction point.

14. The air duct system of claim 13, further comprising an insert piece that is structured as a separate, individual component from the housing, wherein:
- the insert piece is arranged within the at least one air passage at the at least one constriction point and at least partially blocks a flow of air through the at least one air passage; and
- the reduced cross-section of the at least one air passage is at least partially defined by the insert piece.

15. The air duct system of claim 13, wherein the sensor is an air quality sensor.

16. The air duct system of claim 13, wherein the sensor is a dust sensor.

17. An air duct system for conducting air within an HVAC equipment of a motor vehicle, comprising:
- a housing of the HVAC equipment;
- a sensor through which air is flowable;
- the housing including at least two housing parts each with a connecting surface, the at least two housing parts including (i) a first housing part with a first connecting surface and (ii) a second housing part with a second connecting surface;
- the first housing part and the second housing part abutting one another and fixedly connected to each other via the first connecting surface and the second connecting surface;
- an air duct through which air is flowable, the air duct defined by and between the first connecting surface and second connecting surface;
- the air duct connected to the sensor in an air-conducting manner;
- wherein the air duct has a constriction point at which a cross-section of the at least one air duct is reduced; and
- wherein the air duct is one of i) an inflow air duct for conducting an inflow of air to the sensor such that the constriction point is disposed upstream of the sensor and ii) an outflow air duct for conducting an out-flow of air from the sensor such that the constriction point is disposed downstream of the sensor.

18. The air duct system of claim 17, further comprising a second air duct, wherein the second air duct is the other one of i) the inflow air duct and ii) the outflow air duct.

19. The air duct system of claim 18, wherein the second air duct has a second constriction point at which a cross-section of the second air duct is reduced.

20. The air duct system of claim 18, wherein the second air duct is defined by and between the first connecting surface and second connecting surface.

* * * * *